Figure 1:
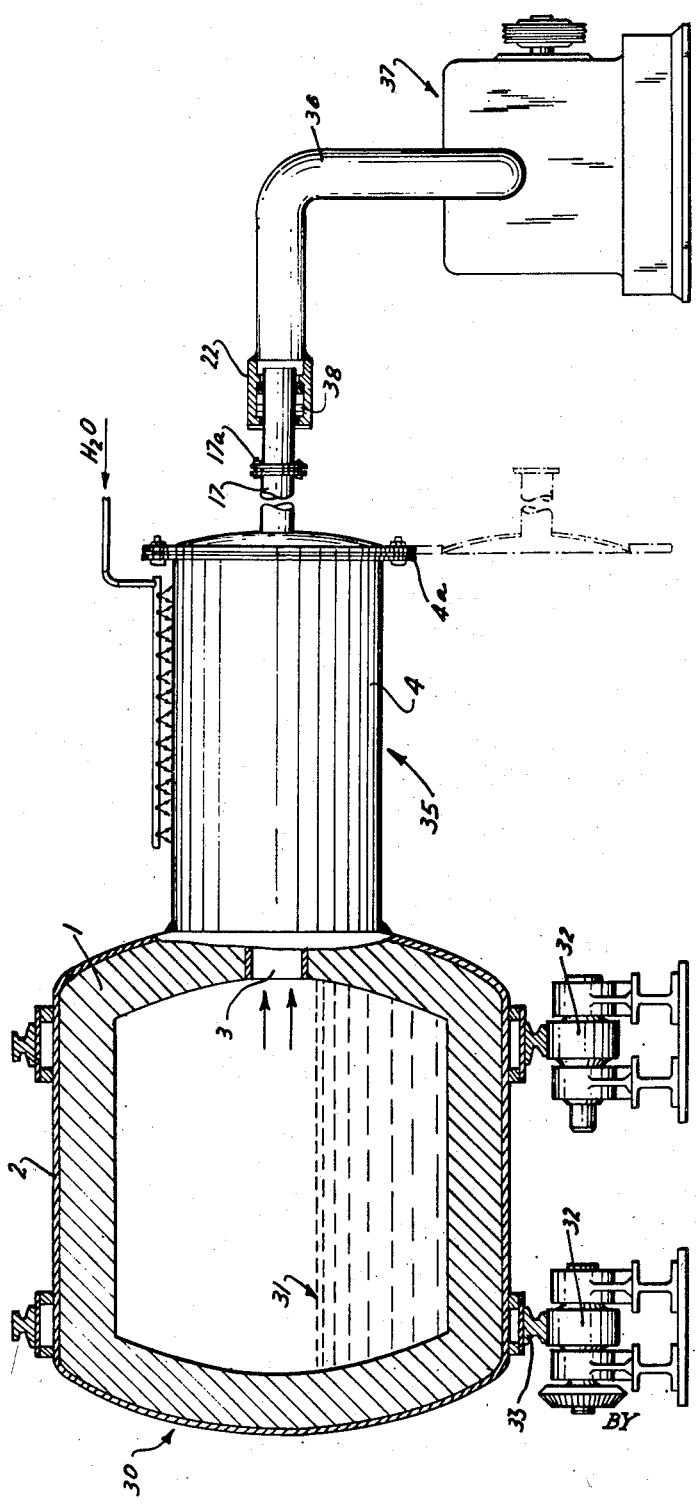

Feb. 19, 1957 P. WEISS 2,782,023
METAL PRODUCING APPARATUS
Filed Feb. 13, 1956 2 Sheets-Sheet 1

INVENTOR.
Paul Weiss
BY
Michael S. Striker
Agent

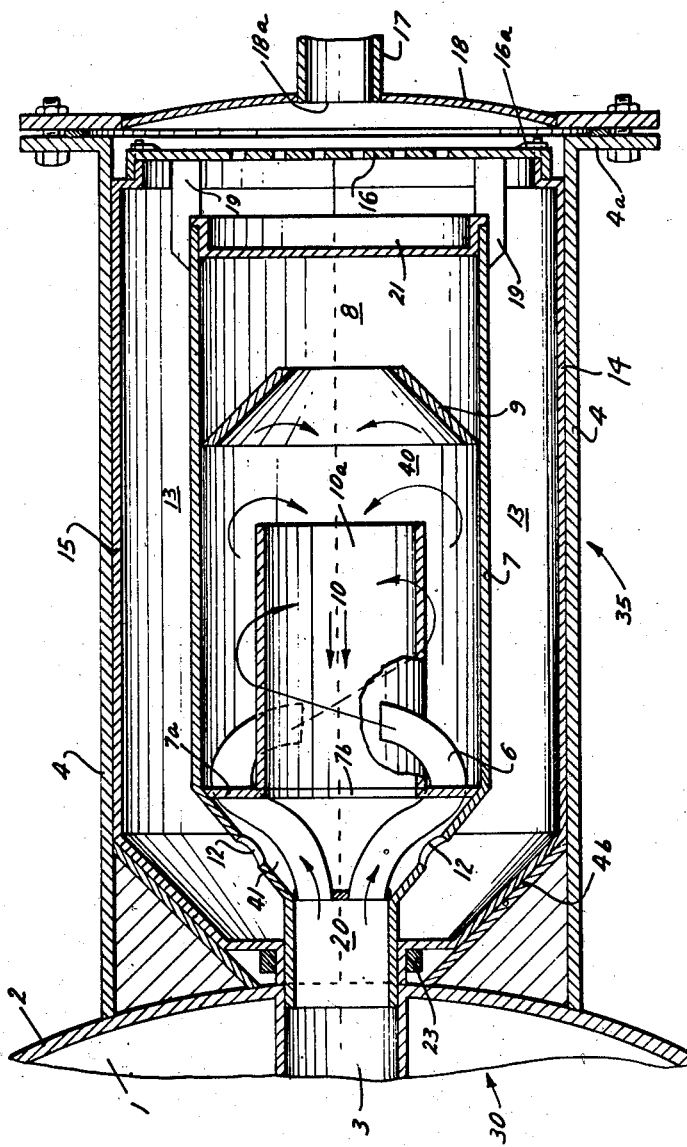

United States Patent Office 2,782,023
Patented Feb. 19, 1957

2,782,023

METAL PRODUCING APPARATUS

Paul Weiss, Bonn, Germany, assignor to Vereinigte Aluminium-Werke Aktiengesellschaft, Bonn, Germany Application February 13, 1956, Serial No. 565,261

Claims priority, application Germany February 11, 1955

12 Claims. (Cl. 266—18)

The present invention relates to a metal producing apparatus.

More particularly, the present invention relates to that type of apparatus wherein a metal in vapor form is provided in a furnace and is then transported in vapor form into a condenser where the metal is condensed.

The description which follows relates to structure for obtaining magnesium from magnesium ore, but it is to be understood that the described structure can be used wherever problems similar to those solved by the structure of the invention arise.

According to a known process, metallic magnesium is obtained by reduction from magnesium oxide or magnesium-oxide-containing materials with silicon, aluminum, or alloys of these metals or with calcium carbide. The magnesium is discharged from the reaction chamber in vapor form and is condensed in a condenser connected to the reaction chamber. The starting material which is charged into the reduction chamber is in the form of finely particulated briquettes, and the working temperature in the reaction chamber is so chosen that the briquettes do not soften or melt in the reduction zone.

Up to the present time it has not been possible in practice to manufacture a completely abrasion resistant briquette without adding undesired components to the charge. Also, the preheating of the briquetted charge in a hydrogen atmosphere does not give a completely satisfactory product. It is not possible in practice to carry out the process without preventing the presence of a more or less large amount of dust in the charge when it is introduced into the reaction chamber. The presence of such dust is particularly undesirable when the process is carried out in a rotary furnace which is electrically heated. Such a furnace provides a quick and uniform heating of the briquettes, which have a poor heat conductivity, and operates with a high thermal efficiency, but because of the continuous movement of the charge there is an abrasion creating dust in addition to that present in the charge at the start of the process, and this dust is carried along with the magnesium vapor into the condenser. Such dust in the condenser is very undesirable because not only does it produce impurities in the condensate but in addition it prevents a compact crystallization of the metal so that a great metal loss occurs in the subsequent melting of the metal, and when the condensate is removed in the open air there is an increased danger of explosion.

It has been learned from experience that the presence of the gas formed in the reaction chamber, which also passes into the condenser, prevents a compact crystallization unless care is taken to prevent this gas which cools with the magnesium at the condenser walls from again mixing with magnesium vapor, since otherwise condensation in the gaseous phase will occur to provide a metal dust.

Tests have shown that a prerequisite to the production of compact magnesium, that is to preventing the formation of magnesium dust, is to separate the briquette dust from the mixture of magnesium vapor and reaction gas and then to lead this mixture to the condensing surface without any return currents in the mixture. Of course, in the ideal case separation of the briquette dust would not be necessary if it were possible to provide an abrasion resistant briquette so that mechanical formation of dust in the furnace could be avoided. However, experience has shown that such a dust free charge cannot be obtained with the present state of the art. However, even if it were possible to eliminate any dust which is carried into the condenser, there would still be the problem of dealing with the reaction gas which passes into the condenser with the metal vapor, even if the reduction process takes place, not in a protective gas atmosphere, but in a high vacuum. The reason for this is that the charge sets free a small amount of adsorbed gas during the reduction process and when the charge is changed gas which has been taken up by the ceramic lining of the furnace is given off slowly and not suddenly. Furthermore, the seal of the interior of the furnace from the exterior is always imperfect to some extent so that a complete separation of the process from outer gases cannot always be guaranteed.

One of the objects of the present invention is to overcome the above drawbacks by providing a condenser capable of producing a perfectly clean and fully compact metal condensate even though the metal vapor, such as magnesium vapor, is drawn into the condenser together with briquette dust and the reaction gas. For example, when magnesium oxide and carbon react together to produce magnesium and carbon monoxide, the latter reaction gas is unavoidably carried into the condenser with the magnesium vapor.

Another object of the present invention is to provide a condenser from which the condensed metal may be quickly and conveniently removed.

A further object of the present invention is to provide a condenser from which the foreign particles such as dust may be removed in a quick and convenient manner.

Still another object of the present invention is to provide a condenser which compels the vapor from the furnace to move, without reversing itself, in a given direction, which guarantees that the metal will be condensed at a predetermined part of the condenser and which guarantees that dust and the like will be trapped and separated from the vapor before metal is condensed from the latter.

Also, it is an object of the present invention to provide an apparatus capable of accomplishing all of the above objects and at the same time composed of simple and ruggedly constructed elments which are very reliable in operation.

With the above objects in view, the present invention mainly consists of a metal reducing apparatus which includes a rotary furnace having an outlet through which a vapor including the reduced metal in vapor state and foreign particles is adapted to pass. Elongated inner and outer condenser housings are carried by the furnace for rotation therewith and define between themselves an elongated annular space, the outer housing being formed distant from the furnace with a condenser outlet communicating only with this annular space and the inner housing having in its interior a transverse partition formed with a first opening and dividing the inner housing into a pair of chambers one of which is nearer to the furnace than the other, a wall portion of the inner housing which defines part of this one chamber being formed with a second opening communicating with the annular space. A conduit means is carried by the inner housing in its one chamber for receiving all of the vapors from the furnace, and the conduit means passing through the partition to direct the vapors to the said other chamber. A tube is carried by the partition in this other chamber and communicates through the above mentioned first opening with the said one chamber, this tube having an open end distant from this one chamber to receive vapor from the other chamber for directing this vapor through the one chamber and above mentioned second opening into the annular space between the housings to move along this annular space to the condenser outlet when the latter is operatively connected to a vacuum pump or the like. A trap means is located in the said other chamber beyond the tube therein for trapping foreign particles to prevent the same from moving into the tube.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a partly diagrammatic, partly sectional view of the general arrangement of a metal reducing structure according to the present invention; and Fig. 2 shows on an enlarged scale and in section, along a central longitudinal plane, the details of a condenser which forms part of the arrangement illustrated in Fig. 1.

Referring now to the drawings, it will be seen from Fig. 1 that a furnace 30 is adapted to receive the charge in any known way not forming part of the present invention, this charge being placed in the furnace up to the level indicated at 31. The furnace is supported for rotation on rollers 32 one of which may be driven, and the furnace carries suitable rings 33 which cooperate with the rollers so that the furnace rotates along the axis A—A. The furnace is composed of an outer wall 2 which is lined with a suitable heat-resistant ceramic material 1, and the furnace is formed with an outlet opening 3 whose axis coincides with the axis A—A. The condenser 35 is fixed to the furnace for rotation therewith and receives the vapors which discharge from the furnace through the outlet 3 thereof. In a manner described below metal is condensed from the vapor after dust and the like is removed therefrom, and the reaction gas, such as the carbon monoxide mentioned above, is drawn from the condenser along a conduit 17 which rotates with the condenser and which communicates with a conduit 36 leading to a vacuum pump 37 driven by any suitable motor or the like and serving to direct such carbon monoxide or other reaction gas to a collection chamber in a known way. The conduit 36 is stationary and has an end portion 22 into which the end of tube 17 leading from the condenser extends so as to be rotatable in the end portion 22, suitable sealing glands being provided to maintain a fluid-tight joint between the rotating tube 17 and the stationary tube 22, 36.

Referring to Fig. 2, the details of the condenser of the invention are illustrated therein. Thus, it will be seen that the condenser includes an outer housing 4 which is fixed, as by welding or the like, to the outer wall 2 of the furnace 30, this outer housing 4 being cylindrical and having an open end distant from the furnace. The open end of the outer housing 4 includes an outwardly extending annular flange 4a, and a cover 18 closes this open end of the housing 4, the cover 18 being connected to the flange 4a by suitable bolts, for example, any suitable sealing ring or the like being provided between cover 18 and the remainder of the outer condenser housing 4, cover 18 forming an end wall of this condenser housing. Furthermore, the cover 18 is formed with the condenser outlet opening 18a which communicates with the tube 17. This tube 17 is made in two sections which have flanges where they are joined together by bolts or the like 17a, and when these bolts 17a are removed, it is possible to turn the cover 18 together with the portion 17 connected thereto to the dot-dash line position shown in Fig. 2 when all but the lowermost of the bolts connected to cover 18 are removed, this lower bolt acting as a hinge. Thus, it is possible to obtain access to the interior of the condenser housing 4. In the interior of the condenser housing 4 next to the furnace 30 a frusto-conical member 4b is welded to the interior of the housing 4 and to the outer surface of furnace 30 about discharge opening 3 thereof, in order to increase the rigidity of the outer condenser housing 4.

An inner condenser housing 7 is located within the outer housing 4 and defines an elongated annular chamber 13 therewith, the outlet 18a communicating with chamber 13 in a manner described below. A partition 7a extends across the interior of the housing 7 and is formed with a central opening 7b, the partition providing a chamber 40 within housing 7 on one side of the partition and a chamber 41 on the opposite side of the partition. A part of the inner housing 7 which forms chamber 41 is formed with openings 12 communicating with the annular chamber 13. It will be noted the chamber 41 is substantially conical and has a tubular inlet fitting snugly but not too tightly in the outlet 3 so that all of the vapors move into the inlet 20 of the outer housing 7. This inlet 20 communicates with a pair of substantially helically curved conduits 6 which extend freely across the interior of the chamber 41 and then through the partition 7a into the chamber 40, the curvature of conduits 6 being such that all of the vapors received from the furnace are directed tangentially along the inner face of housing 7 in a direction away from the partition 7a. A tube 10 is fixed to the partition 7a, communicates with the opening 7b, and has an open end 10a distant from the partition 7a.

Beyond the tube 10 and to the right thereof, as viewed in Fig. 2, there is located within the housing 7 an annular strip 9 which forms part of a cone and which has its outer periphery fixed, as by welding or the like, to the inner surface of the housing 7, the inner periphery of the strip 9 being directed toward the outlet 18a of the condenser. The right open end of the housing 7, as viewed in Fig. 2, is closed by a cover 21 removably fixed to the housing 7 in any suitable way as by screws or the like passing through the cover 21 into the wall of the housing 7.

Located closely next to the inner surface of the outer condenser housing 4 are a pair of shells 14 and 15 which together form a complete cylinder and each of which forms a half cylinder in the form of an elongated channel of substantially U-shaped cross section. At their ends nearest the furnace, the shells 14 and 15 form part of a cone, and they terminate in a circular portion carrying a collar 23 removably connected in any suitable way to the shells 14 and 15 to maintain the same together in their position surrounding the inner condenser housing 7 and spaced therefrom.

The shells 14 and 15 are further held together temporarily by a perforated wall 16, the shells terminating at their right ends, as viewed in Fig. 2, in tongues which respectively pass through openings of the perforated wall 16, these tongues having on the right of wall 16, as viewed in Fig. 2, openings through which wedge members 16a extend to removably connect the perforated wall 16 to the shells 14 and 15.

It will be noted that the tubular inlet 20 of the housing 7 is snugly surrounded by the shells 14 and 15 at their left ends, as viewed in Fig. 2. The end wall 16 has fixed thereto as by welding or the like a plurality of bars 19 formed with shoulders which receive the right end of the housing 7, so that in this way the latter is supported in the interior of the condenser in the illustrated position where the housings 7 and 4 are coaxial.

The outer surface of the condenser is cooled either by blowing air over this outer surface or by spraying water thereon, for example, in the manner indicated diagrammatically in Fig. 1.

The above described structure operates as follows:

When the vacuum pump 37 operates it draws the vapors from the interior of the rotary furnace 30 through the outlet 3 thereof into the inlet 20 of the inner housing 7 and along the conduits 6 into the chamber 40 where the vapor moves tangentially along the inner face of housing 7 toward the right end thereof, as viewed in Fig. 2. The foreign particles such as dust and the like have a momentum great enough to carry them along the strip 9 into the chamber 8 formed between the strip 9 and cover 21, these latter elements thus forming a trap means for trapping foreign particles.

The metal vapor and reaction gas, on the other hand, pass through the open end 10a of the tube 10 to the left along the latter, as shown by the arrows in Fig. 2, and through the opening 7b into the chamber 41 from which the vapor and gas pass through the openings 12 into the annular space 13. It will be noted that by extending the conduits 6 through the chamber 41 the outer surface portions of these conduits in the chamber 41 will necessarily be located in the stream of gas and vapor moving into the space 13, so that condensation cannot occur anywhere in the housing 7. In other words, even if it were possible for condensation to occur by the time the vapor has passed through the tube 10 into the chamber 41, such condensation is prevented by compelling the vapor to come in contact with the conduits 6 which are quite hot due to the fluids passing therethrough directly from the furnace. Thus, condensation is limited to the inner faces of the shells 14 and 15 which are cooled either by air or by water or the like, as mentioned above, and as a result with the condenser of the invention a hollow cylinder of pure compact metal is continuously forming against the shells 14 and 15 in the space 13. The foreign particles such as dust are completely trapped in the chamber 8, and it is impossible for the reaction gas to reverse its direction and come in contact with vapor issuing from the furnace. This reaction gas is continually removed from the chamber 13 through the apertured wall 16 and outlet 18a along conduits 17 and 36 to a suitable collection chamber.

When it is desired to remove the condensed metal from the condenser, it is only necessary to move the cover 18 to the dot-dash line position shown in Fig. 1 in the manner described above, and then the shells 14 and 15 together with all of the structure located within the same are removed from the outer housing 4, the distance between the flange 4a and the connection between the portions of conduit 17 being longer than the housing 4, so that there is sufficient clearance for the shells 14 and 15. After the latter are removed, the cover 16 is disconnected therefrom and the collar 23 is also removed from the shells so that the latter may be separated from each other to thus give access to the hollow cylinder of condensed metal. The inner housing 7 is removed from the interior of the hollow cylinder of condensed metal, and then the cover 21 is removed so that the dust may be cleaned out of the trap chamber 8. Thereafter all of the parts may be reassembled and the operations resumed.

Although the part of housing 7 which forms the chamber 40 is relatively long, it is only necessary that this part of the housing 7, that is the portion thereof located to the right of partition 7a as viewed in Fig. 2, have a length of approximately one fifth of the length of the entire condenser. Such a length is sufficient to provide the desired movement of the fluids. Furthermore, the outer diameter of the housing 7 should not be less than about two thirds the inner diameter of the shells 14 and 15 since otherwise, there will be no positive direction of the mixture of vapor and reaction gas which will guarantee a compact condensate. On the other hand, the diameter of housing 7 should not be so large as to prevent an unrestricted passage of fluid along space 13 at the end of the process.

It will be understood that each of the elements described above, or two or more together, may also find a useful application in other types of metal producing apparatus differing from the types described above.

While the invention has been illustrated and described as embodied in a condenser of metal producing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a metal reducing apparatus, in combination, a rotary furnace having an outlet through which a vapor including the reduced metal in vapor state and foreign particles is adapted to pass; elongated inner and outer condenser housings carried by said furnace for rotation therewith and defining between themselves an elongated annular space, said outer housing being formed distant from said furnace with a condenser outlet communicating only with said annular space and said inner housing having in its interior a transverse partition formed with a first opening and dividing said inner housing into a pair of chambers one of which is nearer to said furnace than the other, a wall portion of said inner housing which defines part of said one chamber being formed with a second opening communicating with said annular space; conduit means carried by said inner housing in said one chamber, receiving all of the vapors from said furnace outlet, and passing through said partition to direct the vapors into said other chamber; a tube carried by said partition in said other chamber and communicating through said first opening with said one chamber, said tube having an open end distant from said one chamber to receive vapor from said other chamber for directing the same through said one chamber and second opening into said annular space to move along the same to said condenser outlet when the latter is operatively connected to a vacuum pump or the like; and trap means located in said other chamber beyond said tube for trapping foreign particles to prevent the same for moving into said tube.

2. In a metal reducing apparatus, in combination, a rotary furnace having an outlet through which a vapor including the reduced metal in vapor state and foreign particles is adapted to pass; elongated inner and outer condenser housings carried by said furnace for rotation therewith and defining between themselves an elongated annular space, said outer housing being formed distant from said furnace with a condenser outlet communicating only with said annular space and said inner housing having in its interior a transverse partition formed centrally with a first opening and dividing said inner housing into a pair of chambers one of which is nearer to said furnace than the other, a wall portion of said inner housing which defines part of said one chamber being formed with a second opening communicating with said annular space; a pair of substantially helically curved conduits carried by said inner housing in said one chamber, receiving all of the vapors from said furnace outlet and passing through said partition to direct the vapors tangentially along the inner surface of said other chamber; a tube, along the exterior of which said conduits extend, carried by said partition in said other chamber and communicating through said first opening with said one chamber, said tube having an open end distant from said one chamber to receive vapor from said other chamber for directing the same through said one chamber and second opening into said annular space to move along the same to said condenser outlet when the latter is operatively connected to a vacuum pump or the like; and trap means located in said other chamber beyond said tube for trapping foreign particles to prevent the same from moving into said tube.

3. In a metal reducing apparatus, in combination, a rotary furnace having an outlet through which a vapor including the reduced metal in vapor state and foreign particles is adapted to pass; elongated, inner and outer condenser housings carried by said furnace for rotation therewith and defining between themselves an elongated annular space, said outer housing having a removable end wall formed with a condenser outlet communicating only with said annular space and said inner housing having in its interior a transverse partition formed with a first opening and dividing said inner housing into a pair of chambers one of which is nearer to said furnace than the other, a wall portion of said inner housing which defines part of said one chamber being formed with a second opening communicating with said annular space; conduit means carried by said inner housing in said one chamber, receiving all of the vapors from said furnace outlet, and passing through said partition to direct the vapors into said other chamber; a tube carried by said partition in said other chamber and communicating through said first opening with said one chamber, said tube having an open end distant from said one chamber to receive vapor from said other chamber for directing the same through said one chamber and second opening into said annular space to move along the same to said condenser outlet when the latter is operatively connected to a vacuum pump or the like; and trap means located in said other chamber beyond said tube for trapping foreign particles to prevent the same from moving into said tube.

4. In a metal reducing apparatus, in combination, a rotary furnace having an outlet through which a vapor including the reduced metal in vapor state and foreign particles is adapted to pass; elongated inner and outer condenser housings carried by said furnace for rotation therewith and defining between themselves an elongated annular space, said outer housing having a removable end wall formed with a condenser outlet communicating only with said annular space and said inner housing having in its interior a transverse partition formed with a first opening and dividing said inner housing into a pair of chambers one of which is nearer to said furnace than the other, a wall portion of said inner housing which defines part of said one chamber being formed with a second opening communicating with said annular space; conduit means carried by said inner housing in said one chamber, receiving all of the vapors from said furnace outlet, and passing through said partition to direct the vapors into said other chamber; a tube carried by said partition in said other chamber and communicating through said first opening with said one chamber, said tube having an open end distant from said one chamber to receive vapor from said other chamber for directing the same through said one chamber and second opening into said annular space to move along the same to said condenser outlet when the latter is operatively connected to a vacuum pump or the like; trap means located in said other chamber beyond said tube for trapping foreign particles to prevent the same from moving into said tube; and a pair of half cylindrical shells located next to the inner face of said outer housing in said annular space, so that when said end wall of said outer housing is removed said shells may be removed from the interior of said outer housing with metal which has condensed on the inner face of said shells.

5. In a metal reducing apparatus, in combination, a rotary furnace having an outlet through which a vapor including the reduced metal in vapor state and foreign particles is adapted to pass; elongated inner and outer condenser housings carried by said furnace for rotation therewith and defining between themselves an elongated annular space, said outer housing having a removable end wall formed with a condenser outlet communicating only with said annular space and said inner housing having in its interior a transverse partition formed with a first opening and dividing said inner housing into a pair of chambers one of which is nearer to said furnace than the other, a wall portion of said inner housing which defines part of said one chamber being formed with a second opening communicating with said annular space; conduit means carried by said inner housing in said one chamber, receiving all of the vapors from said furnace outlet, and passing through said partition to direct the vapors into said other chamber; a tube carried by said partition in said other chamber and communicating through said first opening with said one chamber, said tube having an open end distant from said one chamber to receive vapor from said other chamber for directing the same through said one chamber and second opening into said annular space to move along the same to said condenser outlet when the latter is operatively connected to a vacuum pump or the like; trap means located in said other chamber beyond said tube for trapping foreign particles to prevent the same from moving into said tube; a pair of half cylindrical shells located next to the inner face of said outer housing in said annular space, so that when said end wall of said outer housing is removed said shells may be removed from the interior of said outer housing with metal which has condensed on the inner face of said shells; and means connecting said shells and said inner housing together for simultaneous removal from the interior of said outer housing.

6. In a metal reducing apparatus, in combination, a rotary furnace having an outlet through which a vapor including the reduced metal in vapor state and foreign particles is adapted to pass; elongated inner and outer condenser housings carried by said furnace for rotation therewith and defining between themselves an elongated annular space, said outer housing being formed distant from said furnace with a condenser outlet communicating only with said annular space and said inner housing having in its interior a transverse partition formed with a first opening and dividing said inner housing into a pair of chambers one of which is nearer to said furnace than the other, a wall portion of said inner housing which defines part of said one chamber being formed with a second opening communicating with said annular space, the portion of said inner housing which extends away from said furnace beyond said partition and defines said other chamber being cylindrical along its entire length; conduit means carried by said inner housing in said one chamber, receiving all of the vapors from said furnace outlet, and passing through said partition to direct the vapors into said other chamber; a tube carried by said partition in said other chamber and communicating through said first opening with said one chamber, said tube having an open end distant from said one chamber to receive vapor from said other chamber for directing the same through said one chamber and second opening into said annular space to move along the same to said condenser outlet when the latter is operatively connected to a vacuum pump or the like; and trap means located in said other chamber beyond said tube for trapping foreign particles to prevent the same from moving into said tube.

7. In a metal reducing apparatus, in combination, a rotary furnace having an outlet through which a vapor including the reduced metal in vapor state and foreign particles is adapted to pass; elongated inner and outer condenser housings carried by said furnace for rotation therewith and defining between themselves an elongated annular space, said outer housing being formed distant from said furnace with a condenser outlet communicating only with said annular space and said inner housing having in its interior a transverse partition formed with a first opening and dividing said inner housing into a pair of chambers one of which is nearer to said furnace than the other, a wall portion of said inner housing which defines part of said one chamber being formed with a second opening communicating with said annular space, said inner housing being substantially shorter than said outer housing; conduit means carried by said inner housing in said one chamber, receiving all of the vapors from said furnace outlet, and passing through said partition to direct the vapors into said other chamber; a tube carried by said partition in said other chamber and communicating through said first opening with said one chamber, said tube having an open end distant from said one chamber to receive vapor from said other chamber for directing the same through said one chamber and second opening into said annular space to move along the same to said condenser outlet when the latter is operatively connected to a vacuum pump or the like; and trap means located in said other chamber beyond said tube for trapping foreign particles to prevent the same from moving into said tube.

8. In a metal reducing apparatus, in combination, a rotary furnace having an outlet through which a vapor including the reduced metal in vapor state and foreign particles is adapted to pass; elongated inner and outer condenser housings carried by said furnace for rotation therewith and defining between themselves an elongated annular space, said outer housing being formed distant from said furnace with a condenser outlet communicating only with said annular space and said inner housing having in its interior a transverse partition formed with a first opening and dividing said inner housing into a pair of chambers one of which is nearer to said furnace than the other, a wall portion of said inner housing which defines part of said one chamber being formed with a second opening communicating with said annular space, the portion of said inner housing which extends away from said furnace beyond said partition to define said other chamber therewith having a length which is approximately one fifth of the length of said outer housing; conduit means carried by said inner housing in said one chamber, receiving all of the vapors from said furnace outlet, and passing through said partition to direct the vapors into said other chamber; a tube carried by said partition in said other chamber and communicating through said first opening with said one chamber, said tube having an open end distant from said one chamber to receive vapor from said other chamber for directing the same through said one chamber and second opening into said annular space to move along the same to said condenser outlet when the latter is operatively connected to a vacuum pump or the like; and trap means located in said other chamber beyond said tube for trapping foreign particles to prevent the same from moving into said tube.

9. In a metal reducing apparatus, in combination, a rotary furnace having an outlet through which a vapor including the reduced metal in vapor state and foreign particles is adapted to pass; elongated inner and outer condenser housings carried by said furnace for rotation therewith and defining between themselves an elongated annular space, said outer housing having a removable end wall formed with a condenser outlet communicating only with said annular space and said inner housing having in its interior a transverse partition formed with a first opening and dividing said inner housing into a pair of chambers one of which is nearer to said furnace than the other, a wall portion of said inner housing which defines part of said one chamber being formed with a second opening communicating with said annular space; conduit means carried by said inner housing in said one chamber, receiving all of the vapors from said furnace outlet, and passing through said partition to direct the vapors into said other chamber; a tube carried by said partition in said other chamber and communicating through said first opening with said one chamber, said tube having an open end distant from said one chamber to receive vapor from said other chamber for directing the same through said one chamber and second opening into said annular space to move along the same to said condenser outlet when the latter is operatively connected to a vacuum pump or the like; trap means located in said other chamber beyond said tube for trapping foreign particles to prevent the same from moving into said tube; and a pair of half cylindrical shells located next to the inner face of said outer housing in said annular space, so that when said end wall of said outer housing is removed said shells may be removed from the interior of said outer housing with metal which has condensed on the inner face of said shells, said inner housing having at said other chamber an outer diameter which is at least two thirds of the inner diameter of said shells.

10. A condenser for condensing vapors issuing from a rotary furnace comprising, in combination, an outer elongated housing adapted to be fixed to the rotary furnace and having an end wall formed with a condenser outlet; an inner elongated housing located within said outer housing spaced from said end wall thereof and defining with said outer housing an elongated annular space, said condenser outlet communicating only with said annular space, said inner housing being formed in its interior with a transverse partition dividing said inner housing into a pair of chambers one of which is distant from said outlet and the other of which is nearer to said outlet, said partition being formed with a first opening and said inner housing being formed at said one chamber with a second opening communicating with said annular space; conduit means carried by said inner housing in said one chamber for receiving all of the vapors from the rotary furnace, said conduit means extending through said partition into said other chamber for directing vapors from the furnace into said other chamber; a tube carried by said partition in said other chamber, communicating through said first opening with said one chamber, and having distant from said partition an open end through which vapor moves from said other chamber into said one chamber and from the latter into said annular space and along the latter to said condenser outlet when the latter is connected to a vacuum pump or the like; and trap means in said other chamber of said inner housing beyond said tube for trapping foreign particles.

11. A condenser for condensing vapors issuing from a rotary furnace comprising, in combination, an outer elongated housing adapted to be fixed to the rotary furnace and having an end wall formed with a condenser outlet; an inner elongated housing located within said outer housing spaced from said end wall thereof and defining with said outer housing an elongated annular space, said condenser outlet communicating only with said annular space, said inner housing being formed in its interior with a transverse partition dividing said inner housing into a pair of chambers one of which is distant from said outlet and the other of which is nearer to said outlet, said partition being formed with a first opening and said inner housing being formed at said one chamber with a second opening communicating with said annular space; conduit means carried by said inner housing in said one chamber for receiving all of the vapors from the rotary furnace, said conduit means extending through said partition into said other chamber for directing vapors from the furnace into said other chamber; a tube carried by said partition in said other chamber, communicating through said first opening with said one chamber, and having distant from said partition an open end through which vapor moves from said other chamber into said one chamber and from the latter into said annular space and along the latter to said condenser outlet when the latter is connected to a vacuum pump or the like; trap means in said other chamber of said inner housing beyond said tube for trapping foreign particles; and a pair of half cylindrical shells located in said outer housing next to the inner surface thereof and extending along said annular space so that metal condenses on said shells, said end wall of said outer housing being removable so that said shells can be removed with the condensed metal thereon.

12. A condenser for condensing metal from a vapor comprising, in combination, an elongated tubular inner housing having an open inlet end and having a removable cover at its end opposite said inlet end; a partition extending across the interior of said inner housing, formed with a first opening, and defining in said housing a pair of chambers one of which includes said inlet end and the other of which includes said cover; conduit means carried by said inner housing in said one chamber for receiving all vapors entering into said inlet end, said conduit means passing through said partition for directing the vapors to said other chamber; a tube in said other chamber carried by said partition, communicating with said first opening, and having an open end distant from said partition; an annular strip forming part of a cone located in said other chamber with its outer periphery fixed to the inner surface of said inner housing and with its inner periphery located nearer to said cover than said outer periphery, so that the part of said inner housing between said cover and annular strip forms a dust trap; a pair of half cylindrical shells connected to said housing at said inlet and surrounding and spaced from the remainder of said housing to define an elongated annular space therewith, said inner housing being formed at said one chamber with a second opening communicating with said annular space; a perforated wall connected to said shells and located beyond said cover in spaced relation thereto; a cylindrical outer housing surrounding said shells and having an inner surface next to the same; and an end wall removably connected to said outer housing, adjacent to and substantially coextensive with said perforated wall and formed with a condenser outlet.

References Cited in the file of this patent

UNITED STATES PATENTS

| | | |
|---|---|---|
| 1,006,877 | Queneau | Oct. 24, 1911 |
| 2,021,365 | Leysner | Nov. 19, 1935 |
| 2,021,903 | Tapic | Nov. 26, 1935 |
| 2,158,689 | Buchanan | May 16, 1939 |
| 2,258,374 | Amati | Oct. 7, 1941 |